Patented Sept. 11, 1951

2,567,724

UNITED STATES PATENT OFFICE 2,567,724

POLYSILTHIANES

Leroy S. Moody, Pittsfield, Mass., assignor to General Electric Company, a corporation of New York No Drawing. Application November 29, 1950, Serial No. 198,241

6 Claims. (Cl. 260—448.2)

This invention is concerned with certain organosilicon compounds. More particularly, the invention relates to a cyclic silthiane selected from the class consisting of hexamethyl cyclotrisilthiane and tetraphenyl cyclodisilthiane. The compound hexamethyl cyclotrisilthiane has the following formula:

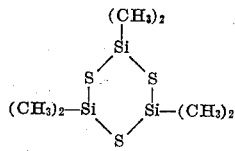

The compound tetraphenyl cyclodisilthiane has the following formula:

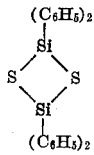

These silthianes possess distinctly different properties from their corresponding siloxane analogues. In particular, it has been found that they are very reactive toward active hydrogen-containing compounds and in this respect these sulfur analogues resemble the chlorides, that is, the organohalogenosilanes more than they do the organosiloxanes. The reactivity of these silthianes with active hydrogen-containing compounds is to be contrasted with the marked stability of organosiloxanes under similar conditions.

In addition, usual methods for making these silthianes employing procedures used in preparing organosiloxanes are ineffective. Thus, it would be believed that the treatment of, for example, dimethyldichlorosilane or diphenyldichlorosilane with hydrogen sulfide would give the above-mentioned compositions. However, this is not the case since I have found that hydrogen sulfide and water, although analogous in many respects, are not equivalent as reactants with organohalogenosilanes. In order to prepare my claimed compositions of matter, it is necessary to effect reaction between the organohalogenosilane, for example, dimethyldichlorosilanes or diphenyldichlorosilane, with the hydrogen sulfide in the presence of a hydrohalide acceptor, for example, pyridine, etc. This reaction may take place in the presence of various solvents for the reactants. I have found that aromatic solvents, such as toluene, benzene, etc., are useful for this purpose. The hydrohalide acceptor forms a salt with the liberated hydrogen halide, for example, hydrogen chloride, and can be removed by filtration together with any complexes which may be obtained between, for instance, the pyridine and the organohalogenosilane. Thereafter, fractional distillation will usually give the desired product which can be further purified by recrystallization from solvents in which it is difficultly soluble when cold, for example, hexane.

The following examples illustrate methods for preparing the claimed compositions of matter. All parts are by weight.

Example 1

158 grams (2 mols) anhydrous pyridine was mixed with 1000 c.c. toluene in a reaction vessel equipped with a stirrer, reflux condenser, thermometer, dropping funnel, and gas inlet tube. The apparatus was so set up that moisture was substantially excluded. Anhydrous hydrogen sulfide was bubbled slowly through the above rapidly stirred mixture at room temperature and at the same time 129 grams (1 mol) dimethyldicholorosilane was added slowly. During the addition, the temperature rose to 40°-60° C. After all of the dimethyldicholorsilane had been added, the system was kept saturated with hydrogen sulfide for about 3 hours. The mixture was then filtered to remove pyridine hydrochloride which had precipitated and any reacted pyridine-dimethyldichlorosilane complex. The precipitate was washed once with toluene and then discarded. The filtrate and washings were combined and distilled to remove toluene, pyridine, and any residual dimethyldichlorosilane. The residue from this distillation was a thin yellow oil which on further distillation at around 200° C. (atmospheric pressure) gave a product which on purification by recrystallization from hexane gave the cyclic derivative, hexamethyl cyclotrisilthiane. This material melted at 106-107° C., was soluble in benzene and toluene, and slightly soluble in hexane. Analysis of this compound showed it to contain 30.9% silicon, 35.2% sulfur, and had a molecular weight of about 264. This compared with the theoretical values of 31.2% silicon, 35.6% sulfur, and a molecular weight of 270. This compound evolved H₂S on contact with such active hydrogen-containing compounds as cyclohexanol, phenol, benzyl alcohol, allyl alcohol, diphenyl silanediol, etc. With water the compound readily gave hydrogen sulfide.

Example 2

The compound tetraphenyl cyclodisilthiane was prepared as follows: 150 grams of diphenyldichlorosilane and 93.5 grams pyridine were mixed together and thereafter anhydrous hydrogen sulfide was passed through the mixture for 5 hours employing essentially the same apparatus and the same conditions as described above in Example 1. After one hour 200 cc. benzene was added, and after 4 hours an additional 200 cc. benzene was added to facilitate filtration. The pyridine hydrochloride was filtered off as was any formed diphenyldichlorosilane-pyridine complex. The precipitate was washed with toluene and the washings combined with the filtrate. The mixture was distilled to a still pot temperature of 240° C. to give a residual oil which crystallized on cooling. This latter material when purified by recrystallization from hexane gave a crystalline material which melted at 145–147° C. Analysis of this crystalline material showed it to contain 12.79% silicon and 14.89% sulfur, and to have a molecular weight of about 428. This compared favorably with the theoretical values of 13.1% silicon, 14.95% sulfur, and a calculated molecular weight of 428. It was evident that the compound was a dimer since if the trimer had been obtained, the molecular weight would be around 642.

The silthianes described above are useful as intermediates in the preparation of other useful silicon compounds. Because of the ease of hydrolysis of these silthianes to give off a very weak acid, $H_2S$, it is possible to prepare silanols, for instance, dimeric silanols. To establish this the following work was carried out.

Example 3

To 100 ml. of a rapidly stirred saturated sodium chloride water solution at 0° C. was added 10 grams crystalline hexamethyl cyclotrisilthiane. The material was slowly hydrolyzed, first through an oil phase, which then on further stirring and reaction solidified to a gummy mass. The gummy mass was filtered and recrystallized from hexane to give needle-like crystals having a melting point of 64–65° C. A mixed melting point with a known sample of tetramethyl disiloxane 1,3-diol, showed no depression of the melting point.

The above-mentioned silthianes can be used as additives to silicone and hydrocarbon oils for improving certain of the properties such as the lubricity properties. It will be apparent that when employed for this purpose, the system in which the silthianes will be used must of necessity be a substantially anhydrous system.

The above-identified compositions of matter may also be used as identifying materials or characterizing agents. Thus, they may be used to differentiate between primary, secondary and tertiary alcohols. I have found that primary alcohols react rapidly with the silthianes, secondary alcohols react less rapidly, and tertiary alcohols react very slowly at room temperature or not at all. These compositions of matter also may have utility as insecticides or fungicides.

What I claim as new and desire to secure by Letters Patent of the United States is:

1. A composition of matter comprising a silthiane selected from the class consisting of (1) hexamethyl cyclotrisilthiane and (2) tetraphenyl cyclodisilthiane.

2. Hexamethyl cyclotrisilthiane.

3. Tetraphenyl cyclodisilthiane.

4. The process for making a compound selected from the class consisting of hexamethyl cyclotrisilthiane and tetraphenyl cyclodisilthiane, which process comprises reacting an organohalogenosilane selected from the class consisting of dimethyldichlorosilane and diphenyldichlorosilane with hydrogen sulfide in the presence of a hydrohalide acceptor comprising pyridine, and thereafter isolating the desired polysilthiane.

5. The process for making hexamethyl cyclotrisilthiane, which process comprises reacting dimethyldichlorosilane with hydrogen sulfide in the presence of a hydrohalide acceptor comprising pyridine and thereafter isolating the aforesaid polysilthiane.

6. The process for making a compound selected from the class consisting of tetraphenyl cyclodisilthiane, which process comprises reacting diphenyldichlorosilane with hydrogen sulfide in the presence of a hydrohalide acceptor comprising pyridine and thereafter isolating the aforesaid polysilthiane.

LEROY S. MOODY.

No references cited.